United States Defensive Publication [19] (H) [11] T989,003

Gorin [43] Dec. 4, 1979

[54] SOLVENT MAKEUP IN SOLVENT EXTRACTION OF COAL

[75] Inventor: Everett Gorin, San Rafael, Calif.

[73] Assignee: Continental Oil Company, Stamford, Conn.

[21] Appl. No.: 969,750

[22] Filed: Dec. 14, 1978

[51] Int. Cl.[2] ..... C10G 1/00; C10G 1/06

[52] U.S. Cl. ..... 208/8 LE; 208/10

[57] ABSTRACT

A coal liquefaction process is provided in which a hydrogen donor solvent is used to at least partially liquefy the coal. The process is maintained in hydrogen donor solvent balance by treatment of selected products obtained in the course of the coal liquefaction process. The required balance is achieved by a series of interrelated operations performed on a hydrofined portion of a solids-free fraction of the coal extract. The interrelated operations include the recovery of an aromatic hydrocarbon-rich portion from the solids-free fraction by selective recovery from the solids-free fraction and from the products of a catalytic cracking operation wherein the remaining portion of the solids-free fraction is used as a feedstock. The aromatic hydrocarbon-rich portion boils within the range of the hydrogen donor solvent, and serves as makeup solvent for the required maintenance of solvent balance.

1 Claim, 1 Sheet Drawing,

14 Pages Specification

The file of this unexamined application may be inspected and copies thereof may be purchased (849 O.G. 1221, Apr. 9, 1968).

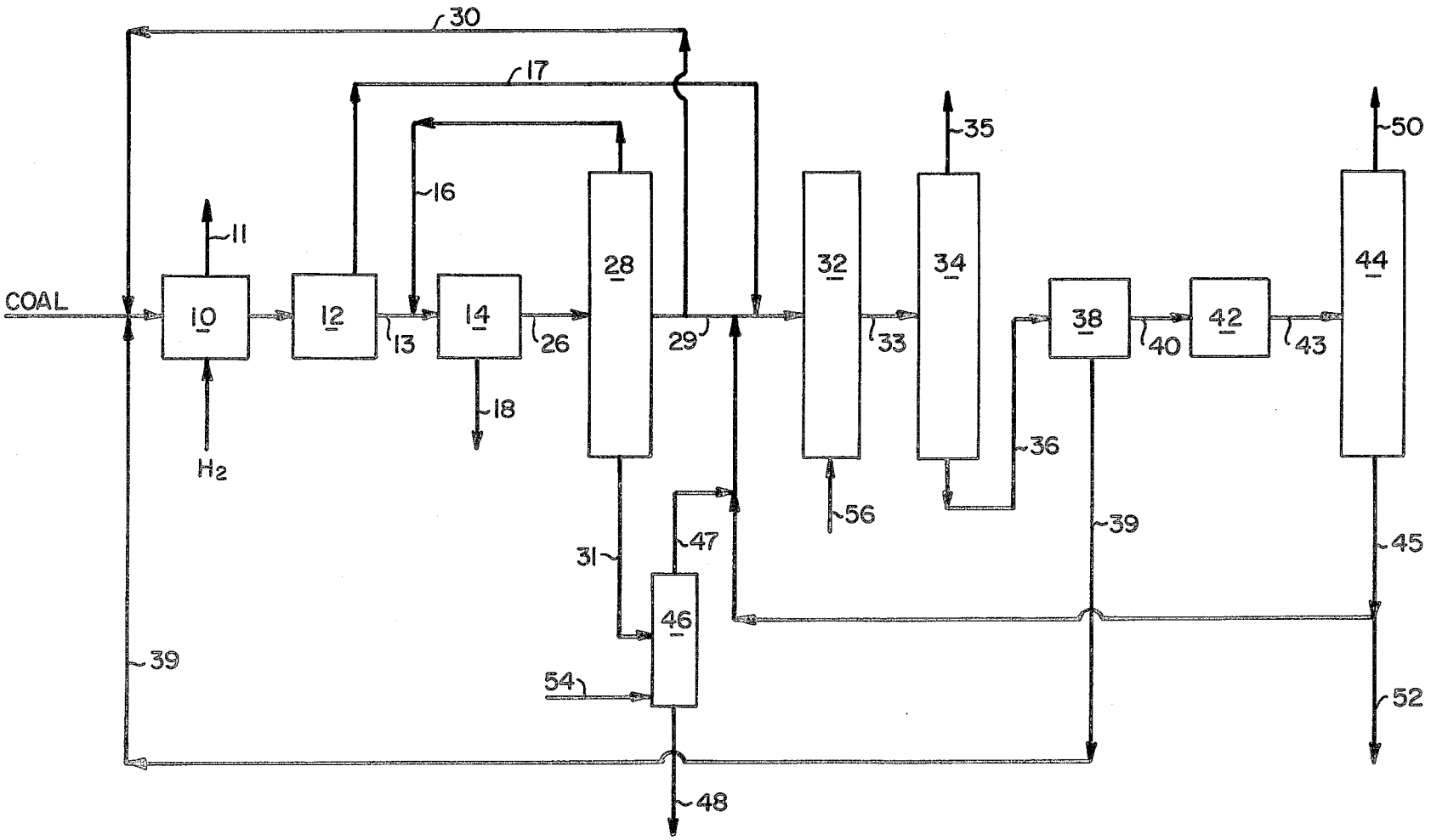
COAL
10
11
$H_2$
12
13
14
18
16
17
30
28
26
29
31
54
46
47
48
32
56
33
34
35
36
38
39
40
42
43
44
45
50
52